United States Patent
Takeshita

(10) Patent No.: US 8,785,009 B2
(45) Date of Patent: Jul. 22, 2014

(54) MAGNETIC RECORDING MEDIUM HAVING SPACE DOTS AND RECORDING DOTS ALTERNATIVELY FORMED IN THE RECORDING TRACK AND METHOD OF MAKING THE SAME

(75) Inventor: Hiroto Takeshita, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 820 days.

(21) Appl. No.: 12/396,797

(22) Filed: Mar. 3, 2009

(65) Prior Publication Data

US 2009/0225473 A1 Sep. 10, 2009

(30) Foreign Application Priority Data

Mar. 4, 2008 (JP) .................................. 2008-053549

(51) Int. Cl.
*G11B 5/64* (2006.01)
(52) U.S. Cl.
CPC ...................................... *G11B 6/746* (2013.01)
USPC .......................................... 428/826; 360/135
(58) Field of Classification Search
None
See application file for complete search history.

(56) References Cited

U.S. PATENT DOCUMENTS

| | | | |
|---|---|---|---|
| 6,420,058 B1 * | 7/2002 | Haratani et al. | 428/845.6 |
| 6,753,043 B1 * | 6/2004 | Kuo et al. | 427/526 |
| 7,561,360 B2 * | 7/2009 | Kamimura et al. | 360/48 |
| 2003/0072971 A1 * | 4/2003 | Fukutani et al. | 428/694 IS |
| 2004/0190180 A1 * | 9/2004 | Hattori et al. | 360/69 |
| 2004/0258833 A1 * | 12/2004 | Kamata et al. | 427/130 |
| 2007/0076319 A1 * | 4/2007 | Takano et al. | 360/75 |
| 2008/0074784 A1 * | 3/2008 | Aoyama | 360/125.02 |
| 2009/0002875 A1 * | 1/2009 | Lee et al. | 360/77.08 |
| 2009/0207523 A1 * | 8/2009 | Kawabe et al. | 360/110 |

FOREIGN PATENT DOCUMENTS

| | | |
|---|---|---|
| JP | 09-297918 | 11/1997 |
| JP | 10-334460 | 12/1998 |
| JP | 11144235 A * | 5/1999 |

OTHER PUBLICATIONS

Derwent Abstract Translation of JP 11-144235 A (Patent Published May 28, 1999).*

* cited by examiner

Primary Examiner — Kevin Bernatz
(74) Attorney, Agent, or Firm — Staas & Halsey LLP

(57) ABSTRACT

A magnetic recording medium includes a plurality of recording tracks magnetically continuous with respect to a recording direction and arranged intermittently in a track width direction, a plurality of recording dots intermittently formed in the recording tracks in the recording direction and a plurality of space dots alternately formed in the recording track with the recording dots in the recording direction and having a magnetic moment per unit area smaller than a magnetic moment per unit area of the recording dots.

6 Claims, 12 Drawing Sheets

MAGNETIC RECORDING MEDIUM HAVING SPACE DOTS AND RECORDING DOTS ALTERNATIVELY FORMED IN THE RECORDING TRACK AND METHOD OF MAKING THE SAME

CROSS-REFERENCE TO RELATED APPLICATIONS

This application is based upon and claims the benefit of priority from the prior Japanese Patent Application No. 2008-53549 filed on Mar. 4, 2008, the entire contents of which are incorporated herein by reference.

BACKGROUND

1. Field

The embodiment(s) discussed herein are related to a magnetic recording medium in which information is recorded by controlling a magnetization direction, and a method of making the magnetic recording medium.

2. Description of the Related Art

Generally, large quantities of data are handled on a daily basis in the field of computers. One example of the devices that can read and write large quantities of data is a hard disk drive (HDD). A HDD has a built-in magnetic disk, which is a disc-shaped magnetic recording medium on which information is recorded. One example of a typical magnetic disk is a continuous medium that includes a disk composed of a non-magnetic material and a continuous magnetic layer on the disk. In this type of magnetic disk, data is recorded by controlling the magnetization directions of crystal grains constituting magnetic domains of the magnetic layer, each magnetic domain being composed of an aggregate of a plurality of crystal grains.

One of the phenomena that obstruct long-term preservation of data recorded on a magnetic disk is a phenomenon known as heat fluctuation. Heat fluctuation is a phenomenon in which the magnetization direction of a magnetic grain becomes unstable due to influence of thermal energy from outside. Heat fluctuation becomes more and more severe as the size of the magnetic grain decreases. Since the recording density of the magnetic disks has become increasingly higher in recent years and crystal grains constituting the magnetic layer thereby has become finer, the problem of heat fluctuation has become more serious.

A perpendicular magnetic recording method for recording data by orienting the magnetization direction of each magnetic domain in a direction perpendicular to a disk surface of the magnetic disk has been known to be a method that can overcome the heat fluctuation and has thus become a mainstream technology in the field of HDDs heretofore. However, there is still an increasing demand for higher recording density. If the size of crystal grains of the magnetic disk is further reduced to achieve a higher recording density, even use of the perpendicular magnetic recording method is not enough to address the problem of heat fluctuation.

In this regard, another type of magnetic disk called a "patterned medium" described below has been proposed as one example of a magnetic disk that achieves a higher recording density and overcomes the problem of heat fluctuation (e.g., refer to Japanese Laid-Open Patent Publication Nos. 9-297918 and 10-334460).

FIGS. 1A and 1B are schematic views showing one example of a magnetic disk of a patterned medium type.

Referring to FIG. 1A, a magnetic disk 500 is a patterned medium on which data is recorded by a perpendicular magnetic recording method. Data is read from or recorded on the magnetic disk 500 with a magnetic head 551 (illustrated in FIG. 1B) mounted at a tip of a head gimbal assembly 550. FIG. 1B is an enlarged view of a region D of the magnetic disk 500 shown in FIG. 1A.

As shown in FIG. 1B, the magnetic disk (patterned medium) 500 has a plurality of small magnetic bodies (dots) 502. Each dot 502 is either a single crystal grain subjected to a forming process or an aggregate of a plurality of crystal grains subjected to a forming process, the crystal grains being strongly magnetically coupled to one another such that they magnetically behave as one crystal grain.

In this example, data is written on and read from each dot 502 with the magnetic head 551 by a perpendicular magnetic recording method. In order to do so, the crystal structure of the crystal grain is utilized. That is, the dot 502 is rendered anisotropic (crystal anisotropy) such that the magnetization direction of the dot 502 is most stable when oriented in a direction perpendicular to the surface of the magnetic disk 500. As a result, as shown in FIG. 1B, each dot 502 individually and homogeneously retains a magnetization direction M perpendicular to the surface of the magnetic disk 500. The magnetic disk 500 has such dots 502 arranged into a plurality of concentric circles on a disk 501 composed of a nonmagnetic material. Thus, a plurality of tracks 510 are formed, as shown in FIG. 1A.

In reading and writing data, the head gimbal assembly 550 moves in the direction indicated by arrow R1 in FIG. 1A to conduct tracking, and the magnetic head 551 mounted at a tip is positioned on the target track 510 from which the data is to be read or on which the data is to be written. While the magnetic head 551 is positioned as such, the magnetic disk 500 is rotated in a direction indicated by arrow R2 in FIG. 1A, and a plurality of dots 502 forming the target track 510 pass under the magnetic head 551 one after another. Data is read when the magnetic head 551 detects the magnetization direction of the dot 502 passing directly thereunder. Data is written when the magnetic head 551 applies a magnetic field to the dot 502 passing directly underneath so as to orient the magnetization direction of that dot 502 in a direction that corresponds to the direction of the applied magnetic field.

FIG. 1B shows arrangements of dots 502 of three adjacent tracks 510 (FIG. 1A) and the magnetic head 551 positioned above a center track of the three tracks 510 to read data from or write data on the target center track 510.

Unlike the continuous medium-type magnetic disk in which a minimum unit of data is written on an aggregate of a plurality of crystal grains described above, the magnetic disk 500 of a patterned medium type has a minimum unit of data recorded on the dot 502. The dot 502 is either a single crystal grain or behaves as a single crystal grain. Accordingly, while each dot 502 can be made finer to increase the recording density, the size of the crystal grain of the patterned medium-type magnetic disk 500 can be made larger than that of the continuous medium-type magnetic disk (the size of the crystal grain is a factor that affects the resistance to the heat fluctuation). In general, a patterned medium-type magnetic disk offers substantially the same recording density as that offered by a continuous medium-type magnetic disk, but with crystal grains several times to several ten times larger than the crystal grains of the continuous medium-type magnetic disk. Thus, very high resistance to heat fluctuation can be achieved.

According to the magnetic disk 500 of a patterned medium type shown in FIG. 1, the width W of the dot 502 in a direction of the radius of the magnetic disk 500 (radial direction) is equal to the width of the track 510. However, the width of the track 510 is restricted by the size of the magnetic head 551.

Thus, in reducing the size of the dot 502 to achieve higher recording density, it is difficult to decrease the width W in the radial direction beyond a certain limitation. In this respect, the length L of the dot 502 in a direction extending about the center of the magnetic disk 500 (circumferential direction) is decreased to reduce the size of the dot 502. In general, a patterned medium-type magnetic disk is designed to have a bit aspect ratio (BAR) of about 2 to about 3. The BAR is a ratio of the width W of the dot 502 in the radial direction to the length L of the dot 502 in the circumferential direction.

A magnetic body having a biased shape has anisotropy dependency upon the bias of its shape (shape anisotropy) in addition to the crystal anisotropy described above. The shape anisotropy of the dot 502 of the magnetic disk 500 of a patterned medium type shown in FIGS. 1A and 1B is described below.

FIG. 2 is a diagram illustrating the shape anisotropy of the dot 502 shown in FIGS. 1A and 1B.

The dot 502 is a rectangular parallelepiped magnetic body having a length L in the circumferential direction smaller than the width W in the radial direction, as described above. The magnetization direction of a rectangular parallelepiped magnetic body tends to orient in the longitudinal direction rather than in the transverse direction. In general, the crystal anisotropy is stronger than the shape anisotropy. The magnetization direction M of the dot 502 is therefore oriented in a direction perpendicular to the surface of the magnetic disk 500, i.e., a direction along the Z axis of the coordinate system shown in FIG. 2. However, due to the shape anisotropy of the dot 502, the magnetization direction M of the dot 502 is more apt to rotate in the direction shown by arrow R4 in the Z-Y plane, i.e., in the longitudinal direction of the dot 502, than in the direction shown by arrow R3 in the Z-X plane, i.e., in the transverse direction of the dot 502, of the coordinate system.

As described above, in recording data, the magnetic head 551 is positioned, by a tracking operation, above the target track 510 on which the data is to be recorded. The magnetic head 551 applies a magnetic field to a dot 502 of the target track 510 passing thereunder to orient the magnetization direction of that dot in the direction of the applied magnetic field. The magnetization field applied from the magnetic head 551 usually has not only a component in the Z axis direction but also a component in a direction parallel to the surface of the magnetic disk (the X axis direction or the Y axis direction) so that data is recorded with a synthetic magnetic field in which these components are combined. In other words, since a slanted radial magnetic field is applied to the magnetic disk from the tip of the magnetic head 551, a magnetic field substantially in the Z-X plane and sloped with respect to the Z axis is applied to the dot 502 of the target track 510. Such a magnetic field causes the magnetization direction M to rotate in the direction shown by arrow R3, i.e., the direction in which the magnetization direction M is relatively difficult to rotate.

FIG. 3 is a schematic diagram showing the magnetic head 551 applying a magnetic field to the dot 502 passing directly thereunder.

FIG. 3 shows a dot (center dot) 502_1 of a target track (center track) 510_1 on which the magnetic head 551 records data, and two dots (side dots) 502_2 and 502_3 respectively belonging to tracks (side tracks) 510_2 and 510_3 adjacent to the center track 510_1.

As described above, in recording data, a magnetic field H1, which is substantially in the Z-X plane and slanted with respect to the Z axis, is applied from the magnetic head 551 to the center dot 502_1. As a result, the magnetization direction M1 of the center dot 502_1 is urged to rotate in a direction shown by arrow R5 in the Z-X plane.

During this operation, leakage magnetic fields H2 and H3 are applied to the vicinity of the center dot 502_1 from the magnetic head 551. The leakage magnetic field H2 sloping down to the left and substantially in the Z-Y plane is applied to the left side dot 502_2 in FIG. 3, and the leakage magnetic field H3 sloping down to the right and substantially in the Z-Y plane is applied to the right side dot 502_3 in the drawing. As a result, the magnetization direction M2 of the left side dot 502_2 is urged to rotate in a direction shown by arrow R6 in the Z-Y plane, and the magnetization direction M3 of the right side dot 502_3 is urged to rotate in a direction shown by arrow R7 in the Z-Y plane.

As described above, the rotation direction in the Z-Y plane is the direction in which the magnetization direction M of each dot 502 easily rotates due to the shape anisotropy. As a result, because of such an ease of rotation, even if the leakage magnetic fields H2 and H3 are weak, the magnetization direction M2 of the left side dot 502_2 and the magnetization direction M3 of the right side dot 502_3 sensitively react to the leakage magnetic fields H2 and H3 and may rotate.

In other words, the existing patterned medium described above may experience destruction of previously recorded data during data recording operation due to the shape anisotropy of the dots.

Although the problem of data destruction during data recording is described above by using a perpendicular magnetic recording-type patterned medium as an example, the same problem may arise with a longitudinal magnetic recording (LMR)-type patterned medium on which data is recorded by controlling the magnetization directions in the in-plane directions of the recording disk. Moreover, although oversensitive response, caused by shape anisotropy, of the magnetization directions of the dots in the side tracks toward the leakage magnetic fields is described above as an example of the cause of destruction of previously recorded data, the cause of the magnetization rotation under the leakage magnetic fields is not limited to this. For example, even when the dot has no shape anisotropy, the same problem may occur when the track width is excessively narrowed to increase the data recording density and the magnetization of the dots of the side tracks are thus more sensitive to leakage magnetic fields.

SUMMARY

According to an aspect of an embodiment of the present invention, a magnetic recording medium includes a plurality of recording tracks magnetically continuous with respect to a recording direction and arranged intermittently in a track width direction, a plurality of recording dots (bodies or elements) intermittently formed in the recording tracks in the recording direction and a plurality of space dots alternately formed in the recording track with the recording dots in the recording direction and having a magnetic moment per unit area smaller than a magnetic moment per unit area of the recording dots.

The above-described embodiments of the present invention is intended as examples, and all embodiments present invention are not limited to including the features described above.

Additional aspects and/or advantages will be set forth in part in the description which follows and, in part, will be apparent from the description, or may be learned by practice of the invention.

BRIEF DESCRIPTION OF THE DRAWINGS

These and/or other aspects and advantages will become apparent and more readily appreciated from the following description of the embodiments, taken in conjunction with the accompanying drawings of which.

DETAILED DESCRIPTION OF EMBODIMENTS

Figure 1A:
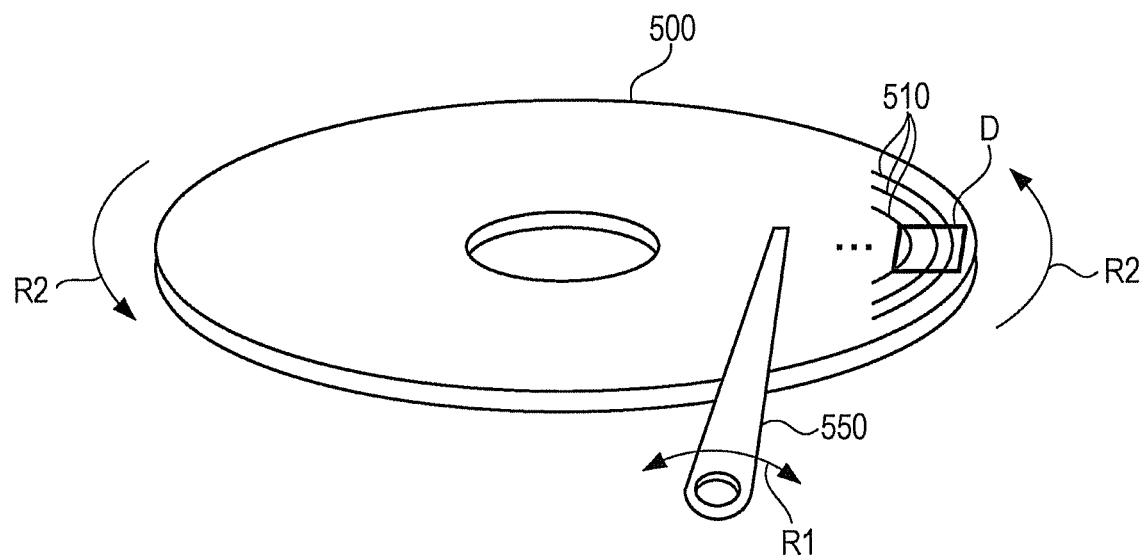
FIGS. 1A and 1B are schematic views showing one example of a magnetic disk of a patterned medium type.
Figure 1B:
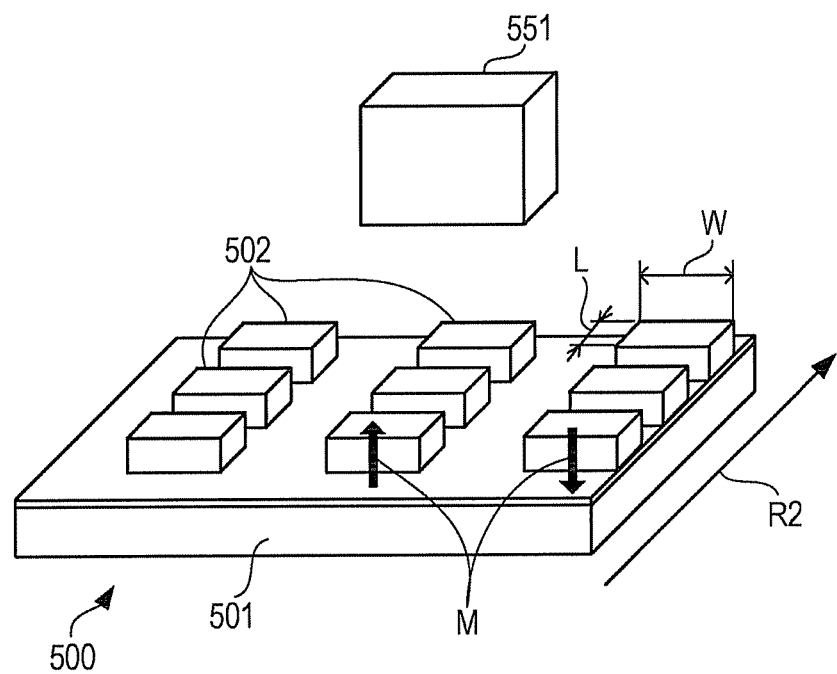
Figure 2:
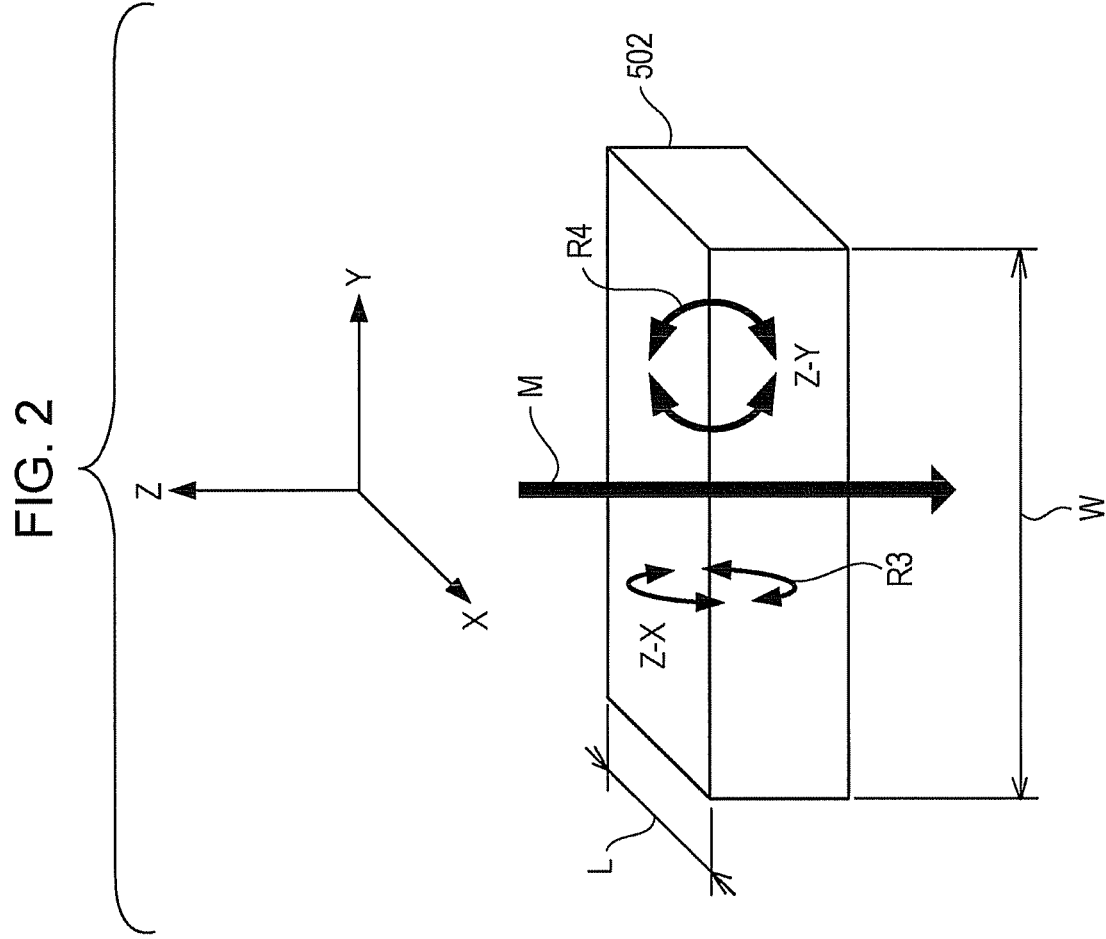
FIG. 2 is a diagram illustrating a shape anisotropy of a dot shown in FIGS. 1A and 1B.
Figure 3:
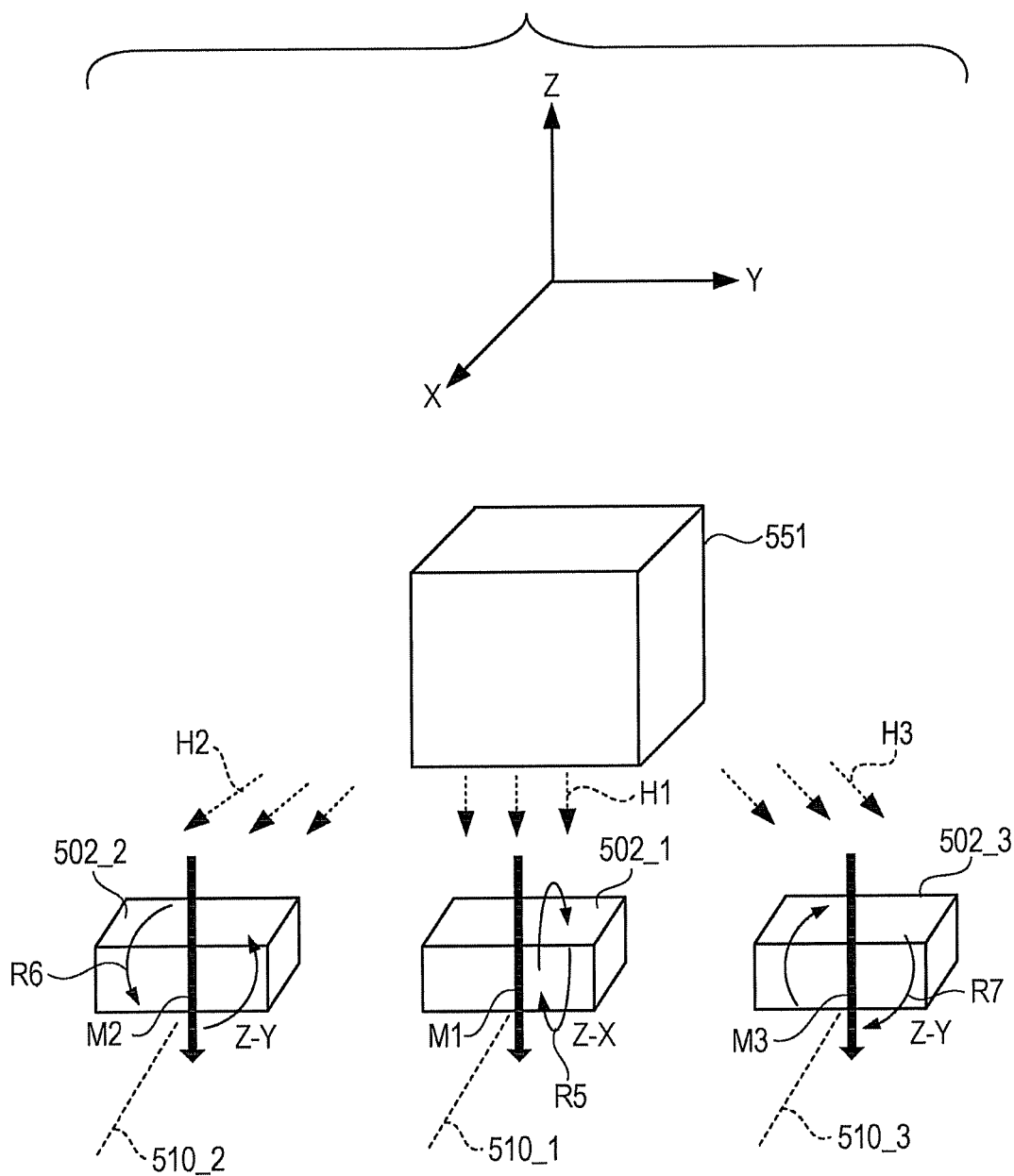
FIG. 3 is a schematic diagram showing a magnetic head applying a magnetic field to a dot passing directly thereunder.

Reference will now be made in detail to the embodiments, examples of which are illustrated in the accompanying drawings, wherein like reference numerals refer to the like elements throughout. The embodiments are described below to explain the present invention by referring to the figures.

Embodiments of the basic and applied modes of the magnetic recording medium and a method of making the magnetic recording medium described above will now be described in detail with reference to the drawings.

Figure 4A:
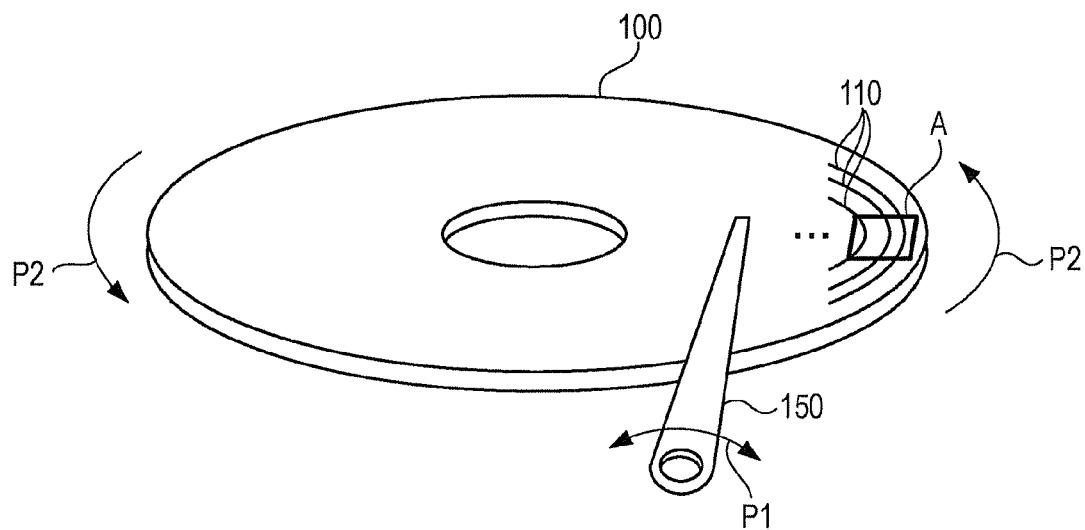
FIGS. 4A and 4B show a patterned medium-type magnetic disk, according to an embodiment of a magnetic recording medium.
Figure 4B:
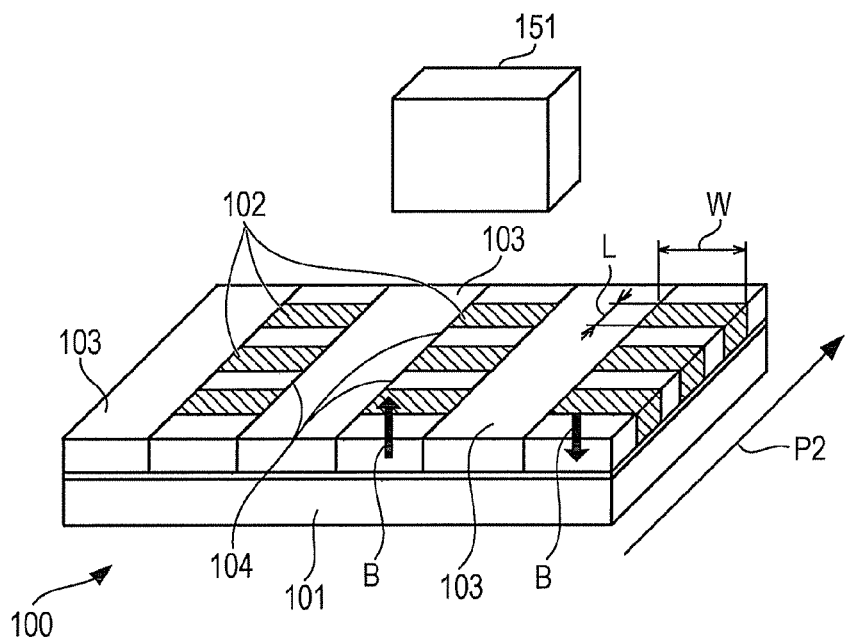

FIGS. 4A and 4B show a patterned medium-type magnetic disk, according to an embodiment of a magnetic recording medium.

FIG. 4A shows a magnetic disk 100 of a patterned medium type on which data is recorded by a perpendicular magnetic recording method, and a head gimbal assembly 150 having at its tip a magnetic head 151 (see FIG. 4B) for reading data from and recording data on the magnetic disk 100. FIG. 4B is an enlarged view of a region A of the magnetic disk 100 shown in FIG. 4A.

As shown in FIG. 4B, the magnetic disk 100 has a plurality of micro magnetic bodies or elements (dots) 102. Each dot 102 is an aggregate of a plurality of crystal grains. However, the crystal grains constituting the dot 102 are strongly magnetically coupled and, magnetically, the dot 102 behaves as if it is a single crystal grain.

In an embodiment, a perpendicular magnetic recording method is employed. Due to the crystal structure of the crystal grains, each dot 102 is rendered anisotropic (crystal anisotropy) such that the magnetization direction in the dot 102 is most stable when oriented in a direction perpendicular to the surface of the magnetic disk 100. As a result, as shown in FIG. 4B, each dot 102 retains a homogeneous magnetization B in a direction perpendicular to the surface of the magnetic disk 100. The magnetic disk 100 has such dots 102 arranged into a plurality of concentric circles on a disk 101 composed of a nonmagnetic material. Thus, a plurality of tracks 110 are formed as shown in FIG. 4A.

The magnetic disk 100 also has a first (set) gap portions 103 composed of a nonmagnetic material. The first gap portions 103 are disposed between the tracks 110 to fill the spaces between the dots 102 in a direction along the radius of the magnetic disk 100 (radial direction). The magnetic disk 100 also has a second (set) gap portions 104 that fill the spaces between the dots 102 in a direction orbiting about the center of the magnetic disk 100 (circumferential direction). The magnetic moment per unit area of the second gap portions 104 is smaller than the magnetic moment per unit area of the dots 102.

A set of the tracks 110, dots 102, and the second gap portions 104 corresponds to a set of the recording tracks, recording dots, and space dots of the basic mode of the magnetic recording medium described above. The radial direction and the circumferential direction are respectively one example of the track width direction and the recording direction of the basic mode of the magnetic recording medium described above. The track width direction in the basic mode is the direction orthogonal to the recording track, and the recording direction in the basic mode is the direction extending along the recording track.

In an embodiment, the second gap portions 104 are formed by ion doping so that the magnetic moment per unit area of the second gap portions 104 is smaller than that of the magnetic material constituting the dots 102, as described below. In an embodiment, the magnetic moment per unit area of the second gap portions 104 is, but is not limited to, 5% or more and 30% or less of the magnetic moment per unit area of the dots 102.

The thickness of the dots 102 and the thickness of the second gap portions 104 are the same and are one example of "film thickness" in the applied mode of the magnetic recording medium described above. The "film thickness" of the applied mode of the magnetic recording medium refers to the thickness of a magnetized portion.

In reading data from and writing data on the magnetic disk 100, the head gimbal assembly 150 moves in a direction indicated by arrow P1 in FIG. 4A to conduct tracking, and the magnetic head 151 mounted at a tip is positioned on the target track 110 to be read or written. While the magnetic head 151 is positioned as such, the magnetic disk 100 is rotated in a direction indicated by arrow P2 in (FIGS. 4A and 4B), and a plurality of dots 102 forming the target track 110 passes under the magnetic head 151 one after another. Data is read when the magnetic head 151 detects the magnetization directions of the dots 102 passing directly underneath. Data is written when the magnetic head 151 applied a magnetic field to the dot 102 passing directly underneath so as to orient the magnetization direction of that dot 502 in a direction that corresponds to the direction of the applied magnetic field.

FIG. 4B shows arrangements of dots 102 of the adjacent three tracks 110 and the magnetic head 151 positioned above the center track of the three tracks 110. The center track 110 is the target track from which data is read or on which data is recorded.

In an embodiment, each dot 102 has a bit aspect ratio (BAR) of 2. The BAR is the ratio of the width W of the dot 102 in the radial direction to the length L of the dot 102 in the circumferential direction. Thus, the dot 102 not only has crystal anisotropy described above but also shape anisotropy that renders the magnetization direction in the dot 102 more apt to rotate in the radial direction than in the circumferential direction.

For the sake of argument, suppose the magnetic disk 100 has only the dots 102 and a magnetic field is applied to a target dot 102 belonging to the target track 110. Then the magnetization directions of the dots 102 adjacent to the target dot 102 in the radial direction sensitively react to the leakage magnetic fields and may rotate in the radial direction. Such rotation of the magnetization direction destroys previously recorded data.

In an embodiment, the shape anisotropy of the dot 102 alone is moderated by the magnetic moment per unit area of the second gap portions 104, as described below.

Figure 5:
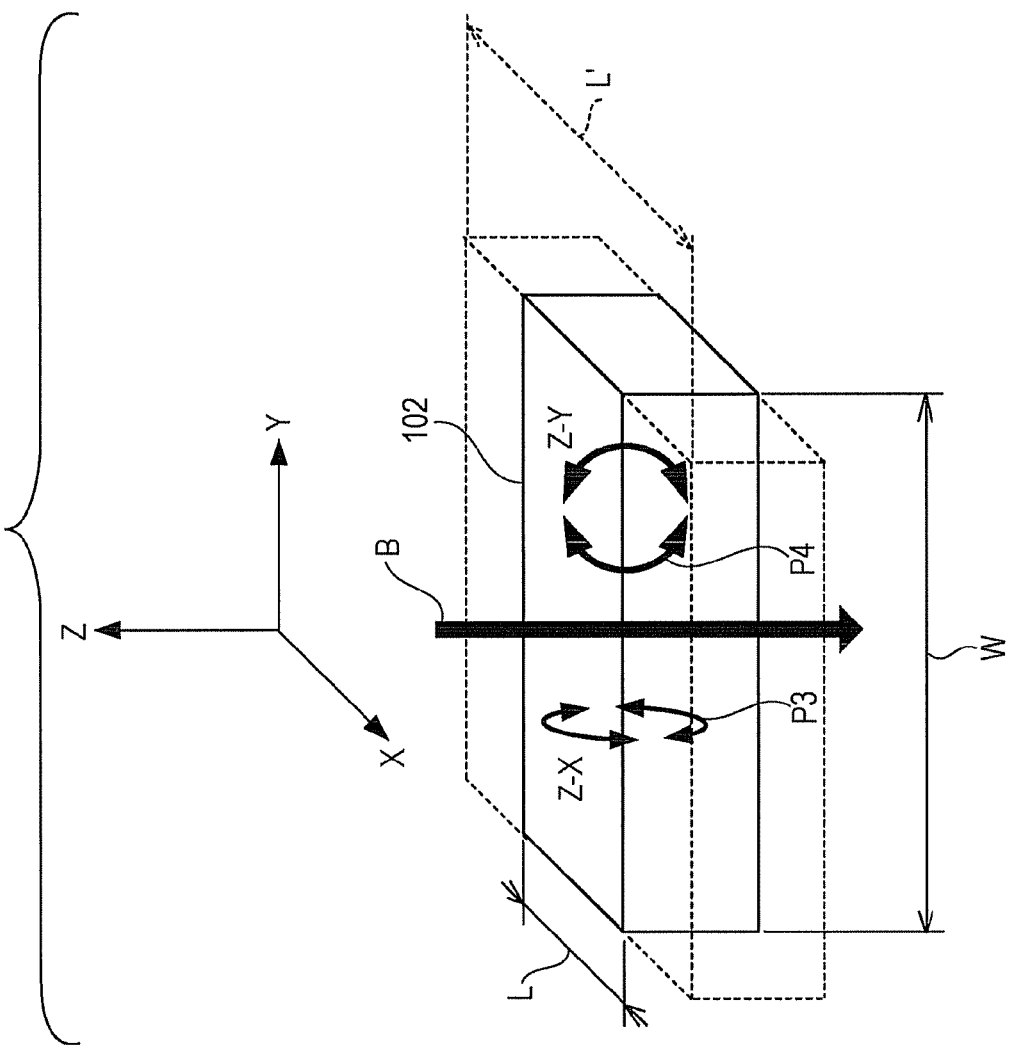
FIG. 5 is a schematic diagram showing how a shape anisotropy of each dot is moderated.

FIG. 5 is a schematic diagram showing how a shape anisotropy of each dot 102 is moderated.

As described in above, the BAR of the dot 102 is 2. The magnetization direction B of the dot 102 retained by the perpendicular magnetic recording method is more apt to rotate in a direction indicated by arrow P4 in the Z-Y plane, i.e., the longitudinal direction, than in a direction indicated by arrow P3 in the Z-X plane, i.e., the transverse direction of the dot 102 in the coordinate system shown in FIG. 5.

However, in an embodiment, each dot 102 is sandwiched between the second gap portions 104 in the circumferential direction, and the second gap portions 104 have a magnetic moment per unit area of 5% or more and 30% or less of the magnetic moment per unit area of the dot 102. This means that while each dot 102 retains its individuality, the length L of each dot 102 in the circumferential direction can be deemed to have been extended to a length L' by a length corresponding to the magnetic moment of the second gap portion 104. In other words, new shape anisotropy that makes the magnetization direction B more apt to rotate in the circumferential direction has been imparted to each dot 102 by an increase in length in the circumferential direction. As a result, due to the newly imparted shape anisotropy, the shape anisotropy of the dot 102 is moderated. In an embodiment, the sensitivity of the magnetization directions of the dots 102 other than the target dots toward the leakage magnetic fields is lowered due to the moderation in shape anisotropy and the magnetization directions of these dots 102 are prevented from rotating due to the leakage magnetic fields. The problem of destruction of previously recorded data during recording of data can be thereby avoided.

How the problem of data destruction can be avoided by controlling the magnetic moment of the second gap portions 104 will now be described in detail.

In the description below, the extent to which the problem of data destruction can be avoided is evaluated on the basis of an off-track margin. The off-track margin is the allowance width in the radial direction at which data can be recorded without destroying data previously recorded in the dots 102 adjacent to the target dot 102 in the radial direction. The off-track margin is calculated under the following conditions.

Figure 6:
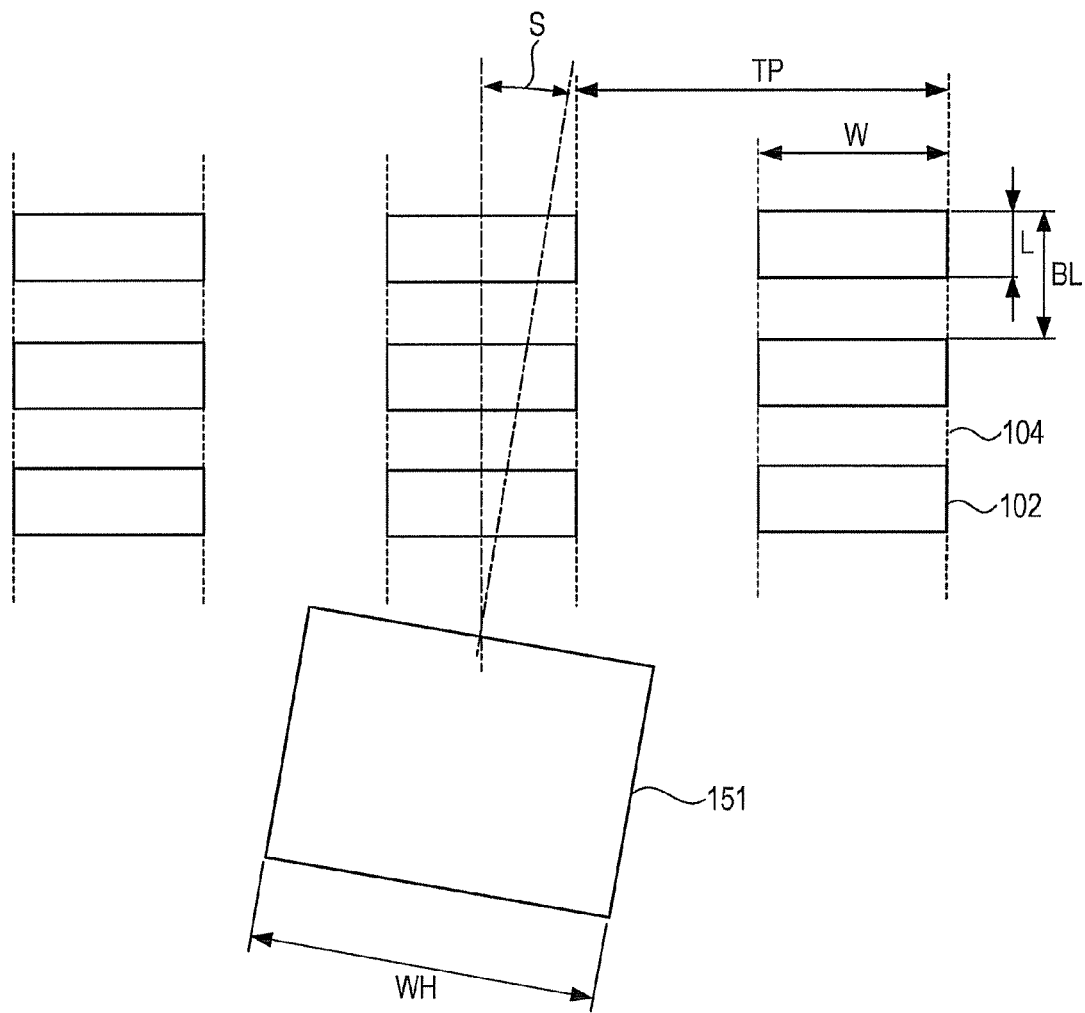
FIG. 6 is a diagram illustrating condition(s) for calculating an off-track margin.

FIG. 6 is a diagram illustrating condition(s) for calculating the off-track margin.

First, the track pitch (TP) is set to 50.8 (nm) and the bit length (BL), which is the dot pitch needed for recording 1-bit data, is set to 25.4 (nm). These values are set by assuming a data recording density of 500 (Gbit/in$^2$), i.e., 0.775 (Gbit/mm$^2$).

As described above, the BAR is 2. The width W of each dot 102 in the radial direction is set to ½ of the track pith TP and the length L of each dot 102 in the circumferential direction is set to ½ of the bit length BL. The thickness of each dot 102 is set to 10 (nm). The crystal anisotropy magnetic field indicating the strength of the crystal anisotropy of each dot 102 is set to 12 (kOe), i.e., 954.96 (kA/m).

The width WH of the magnetic head 151 is set to 40 (nm) and the skew angle S indicating a slope of the magnetic head 151 with respect to the track 110 is set to 15°, which is the largest assumed angle at which the quantity of the leakage magnetic fields applied to the dots 102 other than the target dot 102 is largest. The skew angle S is determined by the amount of rotation of the head gimbal assembly 150. Although FIG. 6 illustrates an example in which only the magnetic head is tilted corresponding to the skew angle S, each dot may have a shape tilting by an angle corresponding to the skew angle S.

Under the conditions described above, data is recorded 1,000,000 times on a plurality of dot 102 constituting a particular track 110, and the off-track margin is calculated while gradually increasing the saturation magnetization ratio, i.e., the ratio of the magnetic moment per unit area of the second gap portions 104 to the magnetic moment per unit area of the dots 102.

Figure 7:
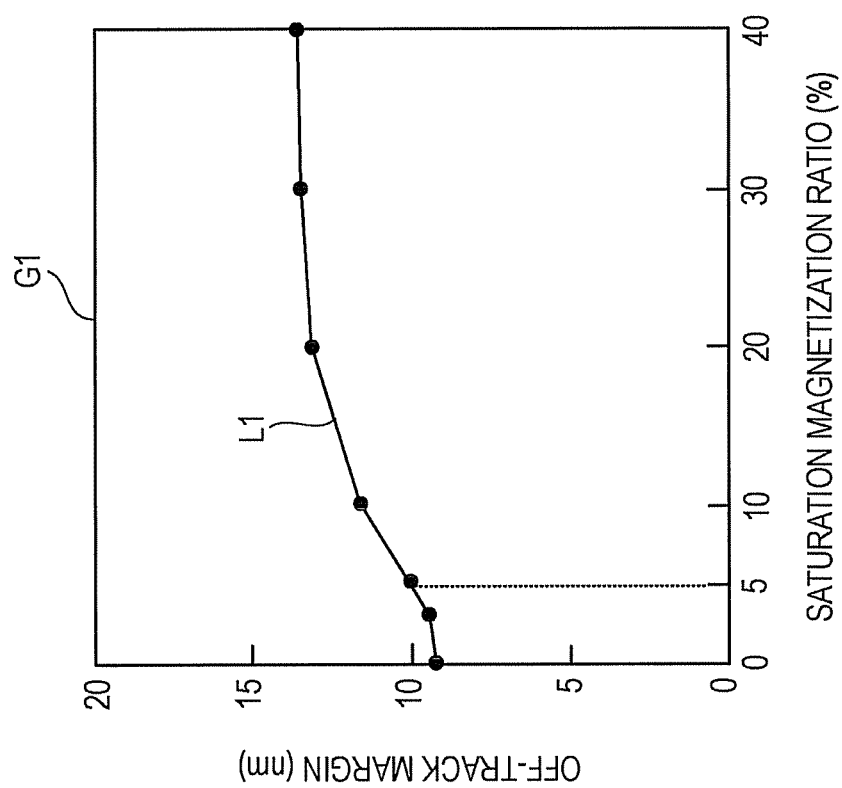
FIG. 7 is a graph in which changes in off-track margins are plotted against changes in a ratio of a saturation magnetization of second gap portions to the saturation magnetization of dots.

FIG. 7 is a graph in which changes in off-track margins are plotted against changes in a ratio of the saturation magnetization of the second gap portions 104 to a saturation magnetization of the dots 102.

Graph G1 in FIG. 7 has a horizontal axis indicating the saturation magnetization ratio (%) and a vertical axis indicating the off-track margin (nm). In graph G1, changes in off-track margin with respect to changes in saturation magnetization ratio are indicated by line L1 connecting solid circular marks.

The line L1 shows that the off-track margin is high at a saturation magnetization ratio exceeding 5%. As described above, the off-track margin is a distance at which the magnetic head 151 is allowed to deviate from a target track but still can record data while avoiding destruction of previously recorded data. A large off-track margin means that data can be recorded without having the neighboring dots 102 affected by leakage magnetic fields from the magnetic head 151. In other words, graph G1 shows that a significant effect for avoiding destruction of previously recorded data can be achieved when the ratio of the saturation magnetization of the second gap portions 104 to the saturation magnetization of the dots 102, i.e., the ratio of the magnetic moment of the second gap portions 104 per unit area to the magnetic moment of the dots 102 per unit area, exceeds 5%. The detailed numerical limitations such as the track pitch used for calculating the off-track margin as described above affect the absolute value of the off-track margin but do not significantly affect the profile of the changes in the off-track margin with respect to the changes in saturation magnetization ratio. The phenomenon that the off-track margin becomes high at a saturation magnetization ratio exceeding 5% is observed not only under the above-described numerical limitations but also in general.

When the magnetic moment of the second gap portions 104 per unit area is large, a large effect can be attained in avoiding the destruction of previously recorded data. However, if the magnetic moment is excessively large, the dots 102 can no longer retain individuality and the noise increases during reading of the data.

Figure 8:
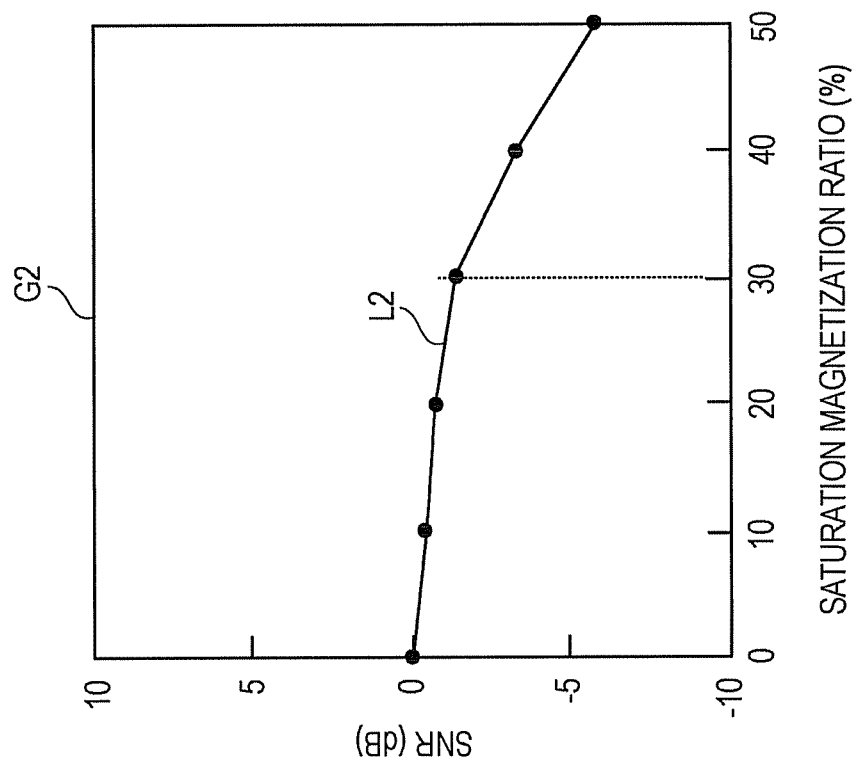
FIG. 8 is a graph in which changes in signal-to-noise ratio (SNR) are plotted against changes in a ratio of a saturation magnetization of second gap portions to a saturation magnetization of the dots.

FIG. 8 shows graph G2 in which changes in signal-to-noise ratio (SNR) are plotted against changes in the ratio of the saturation magnetization of the second gap portions 104 to the saturation magnetization of the dots 102.

Graph G2 of FIG. 8 has a horizontal axis indicating the saturation magnetization ratio (%) and a vertical axis indicating the SNR (dB). The SNR is the ratio of the read signal to noise of the magnetic head 151 calculated by assuming that the magnetic head 151 reads data in which magnetization directions alternate in the circumferential direction under the same conditions as those set for the calculation described above.

Graph G2 in FIG. 8 shows changes in SNR with respect to changes in saturation magnetization ratio. The changes in SNR are indicated by line L2 connecting solid circular marks. The line L2 shows that the SNR is low at a saturation magnetization ratio exceeding 30%. This means that at a saturation magnetization ratio exceeding 30%, it becomes difficult for the dots 102 to retain individuality and the noise during data reading increases beyond the acceptable level. The detailed numerical limitations such as the track pitch described above affect the absolute value of the SNR but do not significantly affect the profile of the changes in SNR against changes in saturation magnetization ratio. The phenomenon that the SNR is low at a saturation magnetization ratio exceeding 30% is observed not only under the above-described numerical limitations but also in general.

As described above, the magnetic disk 100 of an embodiment avoids the problem of destruction of previously recorded data during data recording by moderating the shape anisotropy of each dot 102 with the magnetic moment per unit area of the second gap portions 104 in the circumferential direction. A large effect of avoiding the problem is achieved when the ratio of the magnetic moment per unit area of the second gap portions 104 to the magnetic moment per unit area of the dots 102 exceeds 5%. On the other hand, at a ratio exceeding 30%, it becomes difficult for the dots 102 to retain individuality. Thus, in order to avoid the problem of data destruction while maintaining the individuality of the dots 102, the ratio of the magnetic moment per unit area of the second gap portions 104 to the magnetic moment per unit area of the dots 102 is preferably 5% or more and 30% or less.

Next, a method of making the magnetic disk 100 shown in FIGS. 4A and 4B, according to an embodiment of making the magnetic recording medium, is described.

FIGS. 9A to 9F are schematic diagrams showing operation (s) of making the magnetic disk 100 shown in FIGS. 4A and 4B.

Figure 9A:
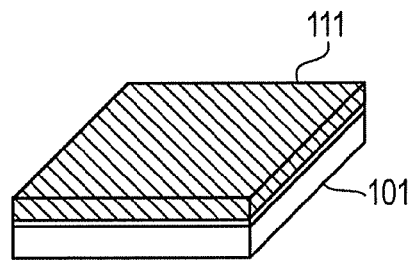
FIGS. 9A, 9B, 9C, 9D, 9E and 9F are schematic diagrams showing operation(s) of making a magnetic disk shown in FIGS. 4A and 4B.

First, in operation S101 shown in FIG. 9A, a magnetic film 111 is formed on the disk 101 (made of a nonmagnetic material) by sputter-depositing a magnetic material, such as, but not limited to, a cobalt-platinum alloy, a chromium-platinum alloy, a multilayer film of cobalt and palladium, or a multilayer film of cobalt and platinum.

Figure 9B:
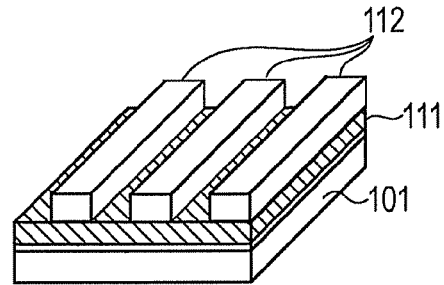

Next, in operation S102 shown in FIG. 9B, a plurality of first mask patterns 112 each having the same width as the width of the dots 102 in the radial direction are formed on the magnetic film. The first mask patterns 112 are aligned in the radial direction of the disk 101 with a pitch equal to the pitch of the dots 102 in the radial direction between the adjacent first mask patterns 112.

Figure 9C:
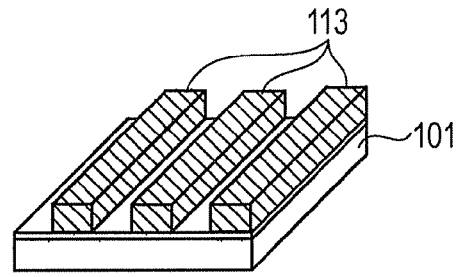

In operation S103 shown in FIG. 9C, portions of the magnetic material not covered with the first mask patterns 112 are removed by ion milling (i.e., etching by ion bombardment) and the first mask patterns 112 are removed with an organic solvent to form a plurality of magnetic patterns 113 on the disk 101. The magnetic patterns 113 extend in the circumferential direction at a pitch equal to the pitch of the dots 102 in the radial direction and have a width equal to the width of the dots 102 in the radial direction.

The process of operation S101 described above is one example of the operation of "forming a magnetic film" in the basic mode of the method of producing the magnetic recording medium described above. The process of operation S102 and the process of operation S103 combined are one example of the operation of "forming a plurality of grooves" in the basic mode of the method of producing the magnetic recording medium described above.

Figure 9D:
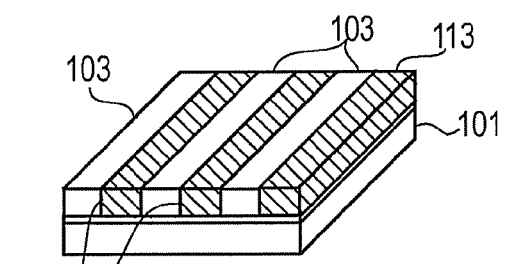

Next, in operation S104 shown in FIG. 9D, the spaces between the magnetic patterns 113 are filled with a nonmagnetic material, such as, but not limited to, silicon oxide or alumina, and the surface is planarized by chemical mechanical polishing (CMP) to form the first gap portions 103. The process of operation S104 is one example of the operation of "filling the grooves with a nonmagnetic material" in the basic mode of the method of making the magnetic recording medium described above.

Figure 9E:
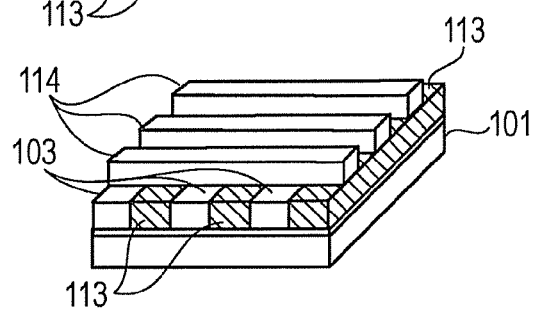

In operation S105 shown in FIG. 9E, a plurality of second mask patterns 114 are formed on a surface of the disk 101 in which the first gap portions 103 and the magnetic patterns 113 are alternately arranged in the radial direction of the disk 101. The second mask patterns 114 extend in the radial direction at a pitch equal to the pitch (bit length) of the dots 102 in the circumferential direction and have a width equal to the width of the dots 102 in the circumferential direction. The process of operation S105 is one example of the operation of "forming resist patterns" in the basic mode of the method of making the magnetic recording medium. The second mask patterns 114 are one example of the resist patterns of the basic mode.

Figure 9F:
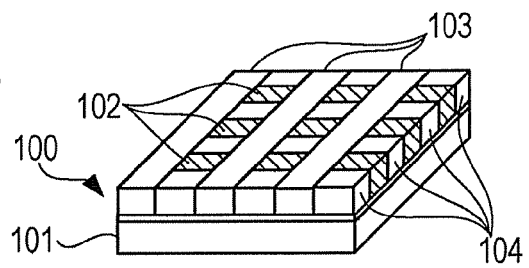

In operation S106 shown in FIG. 9F, portions of the magnetic patterns 113 not covered with the first mask patterns 112 are doped with ions such as, but not limited to, oxygen ions, nitrogen ions, or argon ions, that are reactive to the magnetic material described above to decrease the magnetic moment per unit area of the uncovered portions, the second mask patterns 114 are removed with an organic solvent, and then a protective film composed of diamond-like carbon (DLC) is formed on the surface to complete fabrication of the magnetic disk 100. In the process of operation S106, the dose of ions during ion-doping is controlled so that the magnetic moment per unit area of the portions of the magnetic patterns 113 not covered with the first mask patterns 112 is 5% or more and 30% or less of the initial magnetic moment per unit area of the magnetic patterns 113. The portions not covered with the first mask patterns 112 form the second gap portions 104 described above, and the portions covered with the first mask patterns 112 form the dots 102. The process of operation S106 is an example of the operation of "decreasing a magnetic moment" in the basic mode of the method of making the magnetic recording medium described above.

According to the method shown in FIGS. 9A to 9F, a magnetic disk 100 (see FIGS. 4A and 4B) on which data can be recorded without affecting previously recorded data can be easily manufactured. According to this method, the ion dosage can be controlled to a desired level to obtain a preferred magnetic moment per unit area described above.

The embodiment discussed below differs from the above-discussed embodiment in the configuration of the dots and the second gap portions filling the spaces between the adjacent dots in the circumferential direction. In the description below, the difference is explained.

Figure 10A:
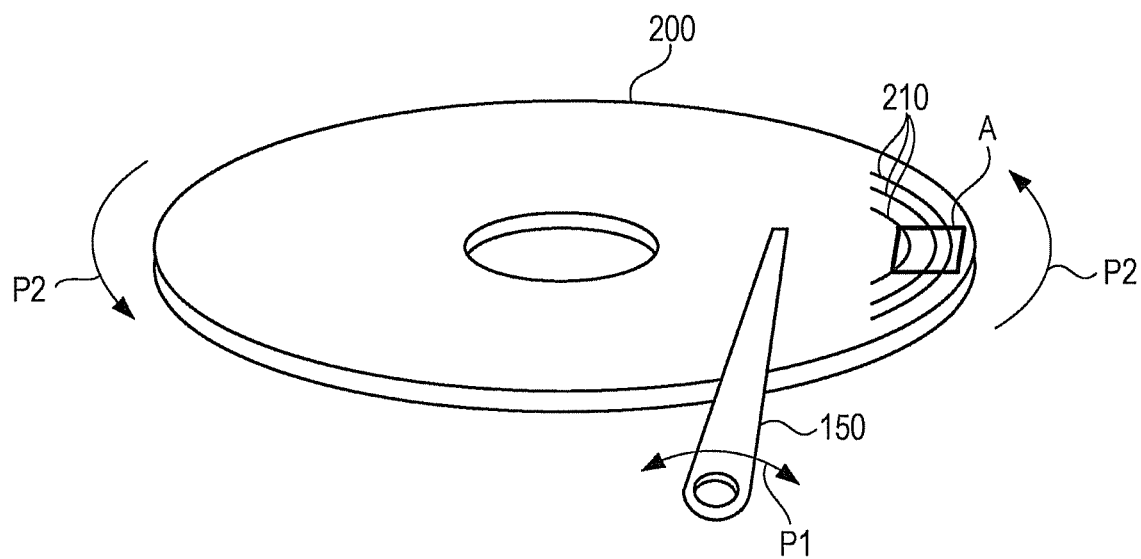
FIGS. 10A and 10B show a magnetic disk of a patterned medium type, according to an embodiment of a magnetic recording medium.
Figure 10B:
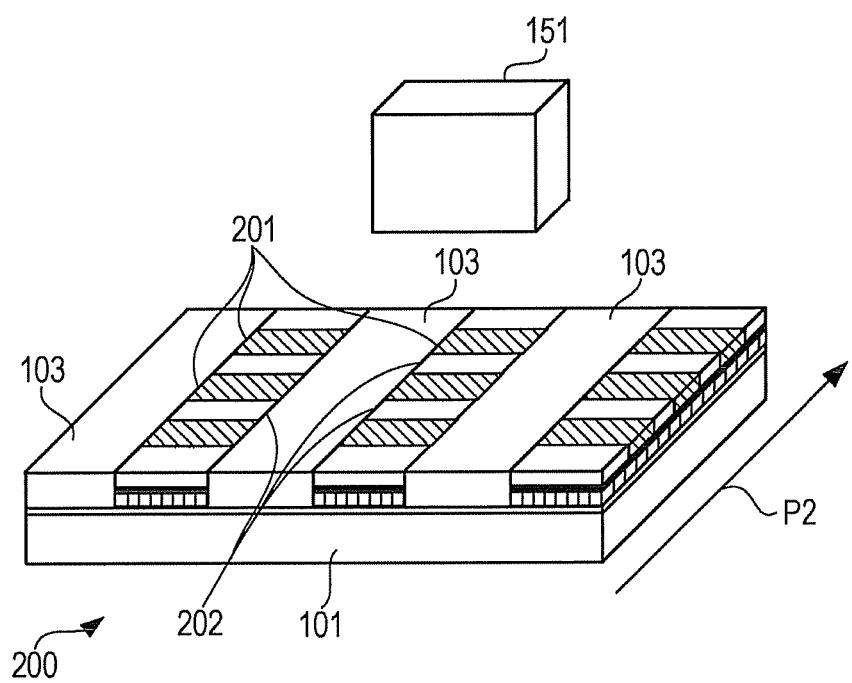

FIGS. 10A and 10B show a magnetic disk of a patterned medium type, according to an embodiment of the magnetic recording medium.

The components illustrated in FIGS. 10A and 10B are given the same reference numerals as those of the corresponding components of the magnetic disk 100 of the above-described embodiment shown in FIGS. 4A and 4B. The description of the common components is omitted to avoid redundancy.

FIG. 10A shows a magnetic disk 200 of a patterned medium type on which data is recorded by a perpendicular magnetic recording method, and a head gimbal assembly 150 that read data from and records data on the magnetic disk 200. FIG. 10B is an enlarged view of a region A of the magnetic disk 200 shown in FIG. 10A.

As shown in FIG. 10B, the magnetic disk 200 of an embodiment includes dots 201 and second gap portions 202 each having a three-layer structure.

Figure 11A:
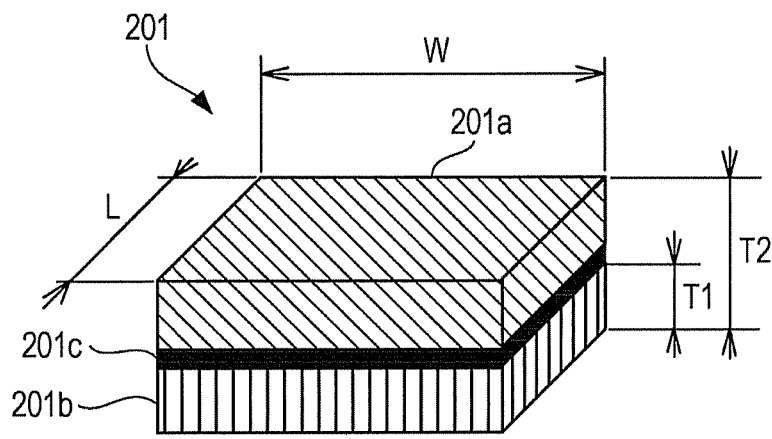
FIG. 11A is an enlarged view showing one of the dots.
Figure 11B:
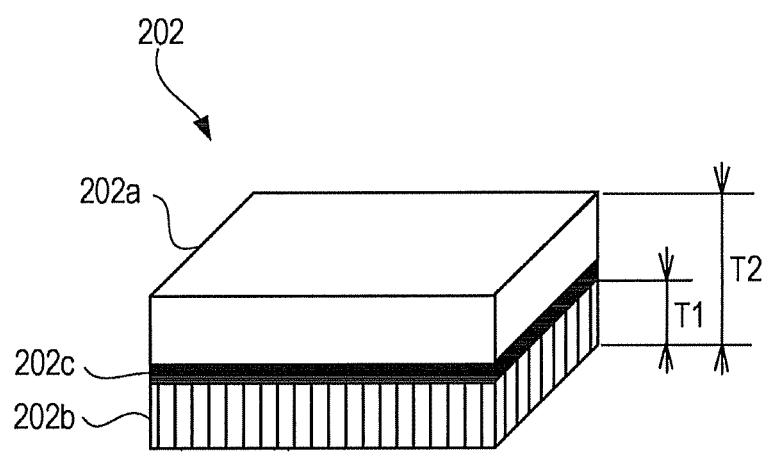
FIG. 11B is an enlarged view showing one of the second gap portions shown in FIG. 10B.

FIG. 11A is an enlarged view showing one of the dots 201 and FIG. 11B is an enlarged view showing one of the second gap portions 202 shown in FIG. 10B.

The dot 201 includes a dot surface magnetic layer 201a composed of a magnetic material, a dot disk-side magnetic layer 201b, and a dot interlayer 201c sandwiched between the magnetic layers 201a and 201b. The dot disk-side magnetic layer 201b is composed of the same magnetic material as the dot surface magnetic layer 201a. The dot interlayer 201c is composed of a titanium-containing material.

In an embodiment, the dot 201 having such a three-layer structure is one example of the recording dot in the basic mode of the magnetic recording medium described above. The magnetic disk 200 has a plurality of dots 201 each having a three-layer structure. The dots 201 are arranged on the disk 101 composed of a nonmagnetic material by forming a plurality of concentric circles to form a plurality of tracks 210 as shown in FIG. 10A. In an embodiment, the tracks 210 are one example of the recording tracks of the basic mode of the magnetic recording medium described above.

The second gap portion 202 includes a surface layer 202a composed of a nonmagnetic material, a second gap portion disk-side magnetic layer 202b, and a second gap portion interlayer 202c sandwiched between the layers 202a and 202b. The second gap portion disk-side magnetic layer 202b is composed of the same magnetic material as the dot surface magnetic layer 201a and the dot disk-side magnetic layer 201b and is continuous with the dot disk-side magnetic layer 201b.

In an embodiment, the second gap portion disk-side magnetic layer 202b is one example of the space dot in the basic mode of the magnetic recording medium described above. The thickness of the second gap portion disk-side magnetic layer 202b is one example of the "film thickness" of the applied mode of the magnetic recording medium described above. In an embodiment, because of the presence of the second gap portion disk-side magnetic layer 202b, the "space dot" achieves "a film thickness smaller than that of the recording dots" in the applied mode of the magnetic recording medium described above.

As with the dot 102 of an embodiment, the dot 201 has a width W in the radial direction larger than the length L in the circumferential direction. The dot 201 alone has a shape anisotropy that renders the magnetization direction inside the dot more apt to rotate in the circumferential direction.

In an embodiment, the second gap portions 202 have a magnetic moment per unit area in proportion to the common thickness T1 of the second gap portion disk-side magnetic layer 202b and the dot disk-side magnetic layer 201b.

In an embodiment, each dot 201 is sandwiched between the second gap portions 202 having the above-described magnetic moment per unit area so that the shape anisotropy of the dot 201 is moderated as in the above-described embodiment. Thus, as with the magnetic disk 100 of the above described embodiment, the magnetic disk 200 of this embodiment allows data to be recorded on the disk without affecting previously recorded data.

In order to achieve the above-described effects while maintaining the individuality of the dots 201, the ratio of the magnetic moment per unit area of the second gap portions 202 to the magnetic moment per unit area of the dots 201 is 5% or more and 30% or less, as in the above-described embodiment. The magnetic moment per unit area of the second gap portions 202 is in proportion to the common thickness T1 of the second gap portion disk-side magnetic layer 202b and the dot disk-side magnetic layer 201b, as described above. The magnetic moment per unit area of the dots 201 is in proportion to the common thickness T2 of the dots 201 and the second gap portions 202. Thus, in order to achieve the preferable ratio of the magnetic moment per unit area, the common thickness T1 of the second gap portion disk-side magnetic layer 202b and the dot disk-side magnetic layer 201b is preferably 5% or more and 30% or less of the common thickness T2 of the dots 201 and the second gap portions 202.

Next, a method of making the magnetic disk 200 shown in FIGS. 10A and 10B, according to an embodiment of the method of making the magnetic recording medium, is described.

FIGS. 12A to 12F are schematic diagrams showing operations of the method of making the magnetic disk 200 shown in FIGS. 10A and 10B.

Figure 12A:
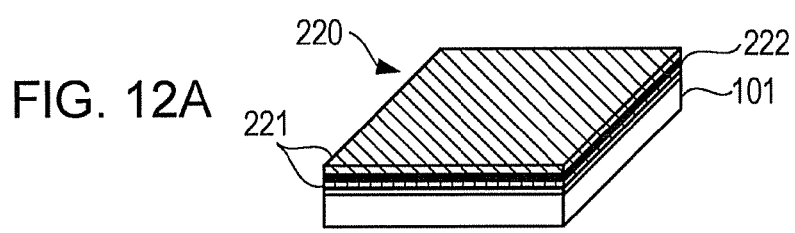
FIGS. 12A, 12B, 12C, 12D, 12E and 12F are schematic diagrams showing operation(s) of making a magnetic disk shown in FIGS. 10A and 10B.

In operation S201 shown in FIG. 12A, a magnetic film 220 having a three-layer structure including two magnetic layers 221 composed of the same magnetic material and an interlayer 222 composed of a titanium-containing material and sandwiched between the two magnetic layers 221 is formed on the disk 101 composed of a nonmagnetic material. In this operation, the magnetic film 220 is formed by depositing the titanium-containing material or the magnetic material by a sputtering technique. The magnetic material forming the magnetic layers 221 may be, but is not limited to, a cobalt-platinum alloy, a chromium-platinum alloy, a multilayer film of cobalt and palladium, or a multilayer film of cobalt and platinum. The thickness of the lowermost magnetic layer 221 of the magnetic film 220 is, but not limited to, 5% or more and 30% or less of the total thickness of the magnetic film 220.

Figure 12B:
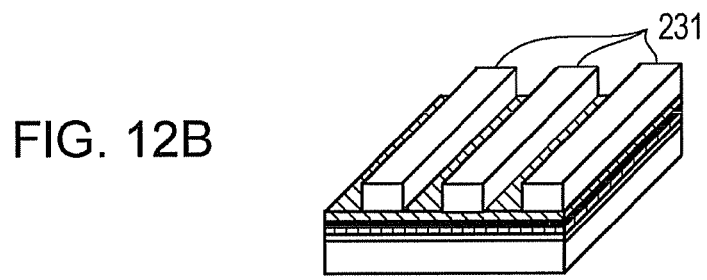

In operation S202 shown in FIG. 12B, a plurality of first mask patterns 231 are formed on the magnetic film 220. The first mask patterns 231 have the same width as the width of the dots 201 in the radial direction of the disk 101 and extend in the circumferential direction at a pitch equal to the pitch of the dots 201 in the radial direction.

Figure 12C:
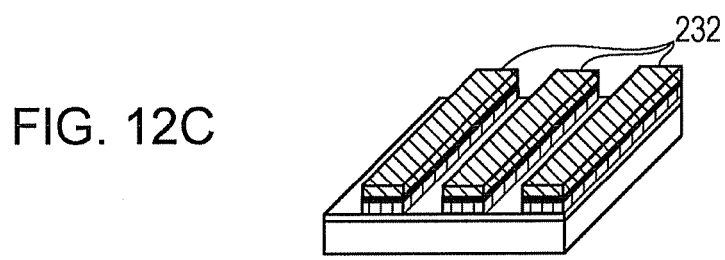

In operation S203 shown in FIG. 12C, portions of the magnetic material not covered with the first mask patterns 231 are removed by ion-milling (etching by ion bombardment), and then the first mask patterns 231 are removed with an organic solvent to form a plurality of magnetic patterns 232 on the disk 101. The magnetic patterns 232 each have a three-layer structure and a width equal to the width of the dots 201 in the radial direction. The pitch between the magnetic patterns 232 in the radial direction is equal to the pitch between the dots 201 in the radial direction.

In an embodiment, the process of operation S201 is one example of the operation of "forming a magnetic layer" in the basic mode of the method of making the magnetic recording medium. The processes of operations S202 and S203 combined are one example of the operation of "forming a plurality of grooves" in the basic mode of the method of making the magnetic recording medium.

Figure 12D:
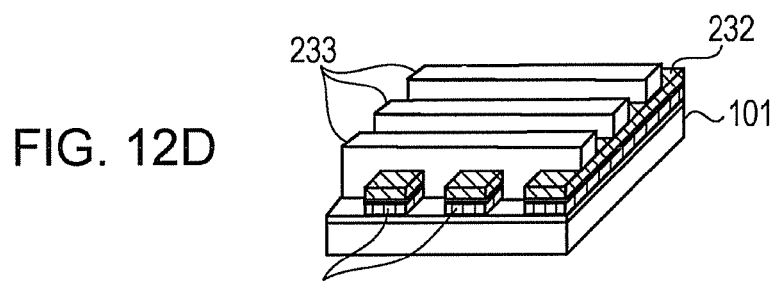

In operation S204 shown in FIG. 12D, a plurality of second mask patterns 233 are formed on the disk 101 having the magnetic patterns 232 formed thereon. The second mask patterns 233 have a width equal to the width of the dots 201 in the circumferential direction of the disk 101 and extend in the circumferential direction of the disk 101 at a pitch equal to the pitch (bit length) of the dots 201 in the circumferential direction. In an embodiment, the process of operation S204 is one example of the operation of "forming resist patterns" in the basic mode of the method of making the recording medium. The second mask patterns 233 are one example of the resist patterns of the basic mode.

Figure 12E:
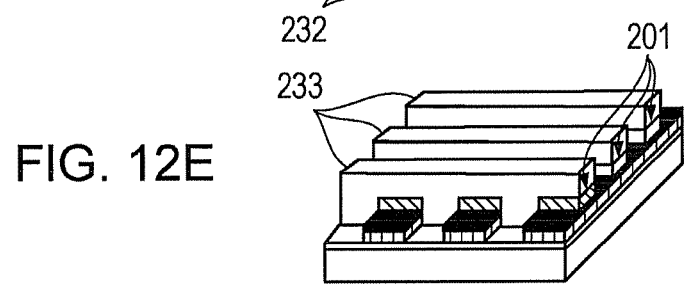

In operation S205 shown in FIG. 12E, portions of the uppermost magnetic layer 221 not covered with the second mask patterns 233 are removed by reactive ion etching with carbon monoxide gas serving as reactive gas. The interlayers 222 of the magnetic patterns 232 having a three-layer structure are composed of a titanium-containing material, as described above. Such a material is not readily reactive with carbon monoxide gas and serves as a good stopper for reactive ion etching. Thus, in the process of operation S205, only the uppermost magnetic layers 221 are exactly removed.

By the process of operation S205, the magnetic moment per unit area of the portions of the magnetic patterns 232 not covered with the second mask patterns 233 decreases by an amount corresponding to the uppermost magnetic layers 221 removed. As described above, the thickness of the lowermost magnetic layer 221 is 5% or more and 30% or less of the entire thickness of the magnetic film 220, i.e., the thickness of the entire magnetic pattern 232. Thus, by the process of operation S205, the magnetic moment per unit area of the portions not covered with the second mask patterns 233 decreases to 5% or more and 30% or less of the magnetic moment per unit area of portions covered with the second mask patterns 233. After operation S205, the portions of the uppermost magnetic layer 221 that remain intact by being covered with the second mask patterns 233 function as the dots 201. The intact portions of the uppermost magnetic layers 221 are the dot surface magnetic layers 201a shown in FIG. 11A. The interlayers 222 underneath the intact magnetic layers 221 are the dot interlayers 201c shown in FIG. 11A. The lowermost magnetic layers 221 underneath the interlayers 222 are the dot disk-side magnetic layers 201b shown in FIG. 11A. In an embodiment, the process of operation S205 is one example of the operation of "decreasing a magnetic moment" in the basic mode of the method of making the magnetic recording medium.

Figure 12F:
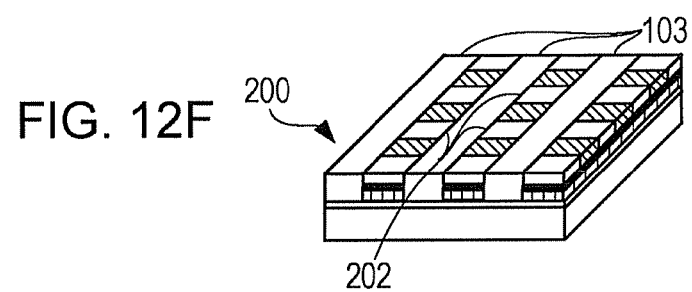

In operation S206 shown in FIG. 12F, after the second mask patterns 233 are removed with an organic solvent, the spaces between the magnetic patterns 232 and the dents formed by removing the uppermost magnetic layers 221 from the magnetic patterns 232 are filled with a nonmagnetic material, such as, but not limited to, silicon oxide or alumina. The surface is planarized by chemical mechanical polishing (CMP), and a protective film composed of diamond-like carbon (DLC) is formed on the surface to complete fabrication of the magnetic disk 200. By the process of operation S206, the spaces between the magnetic patterns 232 are filled with the nonmagnetic material to form the first gap portions 103, and the dents are filled with the nonmagnetic material to form the second gap portions 202. The nonmagnetic material filling the dents is the surface layer 202a shown in FIG. 11B. The interlayer 222 underneath the surface layer 202a is the second gap portion interlayer 202c shown in FIG. 11B. The lowermost magnetic layer 221 under the interlayer 222 is the second gap portion disk-side magnetic layer 202b shown in FIG. 11B. In an embodiment, the process of operation S206 is one example of the operation of "filling the grooves with a nonmagnetic material" in the basic mode of the method of making the magnetic recording medium.

According to the method shown in FIGS. 12A to 12F, magnetic disk 200 shown in FIG. 10 on which data can be recorded without affecting previously recorded data can be easily made. According to this method, since the thickness of the lowermost magnetic layer 221 of the three-layer structure magnetic film 220 formed in operation S201 is controlled to a desired value, a preferable magnetic moment per unit area is achieved as described above.

Although patterned media of a perpendicular magnetic recording type are illustrated above as the embodiments of the magnetic recording medium, the magnetic recording medium is not limited to these. The magnetic recording medium may be a patterned medium of a longitudinal magnetic recording type.

Although patterned media having dots with shape anisotropy are illustrated above as the embodiments of the magnetic recording medium, the magnetic recording medium is not limited to these. For example, the magnetic recording medium may be a patterned medium or the like having dots with no shape anisotropy. In such a case, new shape anisotropy is imparted to each dot due to the magnetized gap portions as described above so that each dot having no shape anisotropy by itself can exhibit shape anisotropy such that the magnetization direction is not readily rotatable in the track width direction, i.e., radial direction, but readily rotatable in the recording direction, i.e., the circumferential direction. As a result, even when the track pitch of the magnetic disk is reduced to improve the recording density, data can be recorded without affecting previously recorded information.

Although examples in which dots and other associated components are directly formed on a disk composed of a nonmagnetic material are illustrated as the embodiments of the magnetic recording medium in the description above, the magnetic recoding medium is not limited to these. The magnetic recording medium may be, for example, a medium having an underlayer (backing layer) composed of a soft magnetic material between the nonmagnetic disk and the dots and associated components. Alternatively, some kind of interlayer may be provided between the underlayer and dots and associated components.

Dots (elements) having a three-layer structure having the lowermost magnetic layer and the uppermost magnetic layer composed of the same magnetic material are illustrated as examples of the dots having a three-layer structure. However, the configuration of the three-layer structure dots is not limited to this. The uppermost magnetic layer may be composed of a magnetic material different from a magnetic material forming the lowermost magnetic layer.

Although three-layer structure dots and second gap portions having interlayers composed of a titanium-containing material are described above, the three-layer structure dots and second gap portions are not limited to these. The interlayers may be composed of a material, other than the titanium-containing material, that can function as a good stopper for etching.

Although a few preferred embodiments of the present invention have been shown and described, it would be appreciated by those skilled in the art that changes may be made in these embodiments without departing from the principles and spirit of the invention, the scope of which is defined in the claims and their equivalents.

What is claimed is:
1. A magnetic recording medium, comprising:
a plurality of recording tracks magnetically continuous with respect to a recording direction and arranged intermittently in a track width direction;
a plurality of recording dots intermittently formed in the recording tracks in the recording direction; and a plurality of space dots alternately formed within the recording tracks with the recording dots in the recording direction, and where the plurality of space dots alternatively formed with the plurality of recording dots are directly contiguous with said recording dots, and a ratio of a magnetic moment per unit area of the plurality of space dots to a magnetic moment per unit area of the plurality of recording dots is between about 5-30%.

2. The magnetic recording medium according to claim 1, wherein the recording dots and the space dots have the same film thickness.

3. The magnetic recording medium according to claim 1, wherein the space dots have a film thickness smaller than a film thickness of the recording dots.

4. The magnetic recording medium according to claim 1, wherein the space dots have a width in a radial direction larger than a length in a circumferential direction.

5. The magnetic recording medium according to claim 1, wherein a ratio of the magnetic moment per unit area of the space dots to a magnetic moment per unit area of an element of the recording tracks is set to a predetermined value.

6. A method for the manufacture of a magnetic recording medium, comprising:

forming a plurality of recording tracks magnetically continuous with respect to a recording direction and arranged intermittently in a track width direction;

forming a plurality of recording dots intermittently formed in the recording tracks in the recording direction; and forming a plurality of space dots alternately filling space within the recording tracks with the recording dots in the recording direction, and where the plurality of space dots alternatively formed with the plurality of recording dots are directly contiguous with said recording dots, and a ratio of a magnetic moment per unit area of the plurality of space dots to a magnetic moment per unit area of the plurality of recording dots is between about 5-30%.

\* \* \* \* \*